July 15, 1952  V. S. DANIELSON  2,603,480
FRICTION SHOCK ABSORBER FOR RAILWAY CAR TRUCKS
Filed May 19, 1950  2 SHEETS—SHEET 1

Inventor:
Vernon S. Danielson.
By Henry Fuchs
Atty.

July 15, 1952  V. S. DANIELSON  2,603,480
FRICTION SHOCK ABSORBER FOR RAILWAY CAR TRUCKS
Filed May 19, 1950  2 SHEETS—SHEET 2

Inventor:
Vernon S. Danielson
By Henry Fuchs
Atty.

Patented July 15, 1952

2,603,480

UNITED STATES PATENT OFFICE 2,603,480

FRICTION SHOCK ABSORBER FOR RAILWAY CAR TRUCKS

Vernon S. Danielson, Dolton, Ill., assignor to W. H. Miner, Inc., Chicago, Ill., a corporation of Delaware Application May 19, 1950, Serial No. 162,913

7 Claims. (Cl. 267—9)

This invention relates to improvements in friction shock absorbers for snubbing or dampening the action of railway car truck springs.

One object of the invention is to provide a friction shock absorber comprising top and bottom friction casings, friction shoes having sliding frictional engagement with said casings, and springs means opposing relative movement of the shoes and casings with respect to each other, wherein the shoes have wedging engagement with each other to spread the shoes apart into tight frictional engagement with the casing friction surfaces.

Other objects of the invention will more clearly appear from the description and claims hereinafter following.

Figure 1:
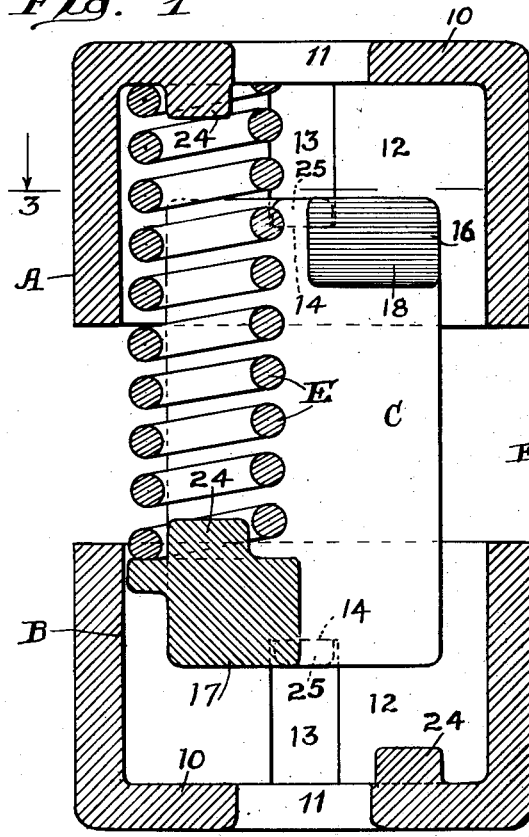
Figure 2:
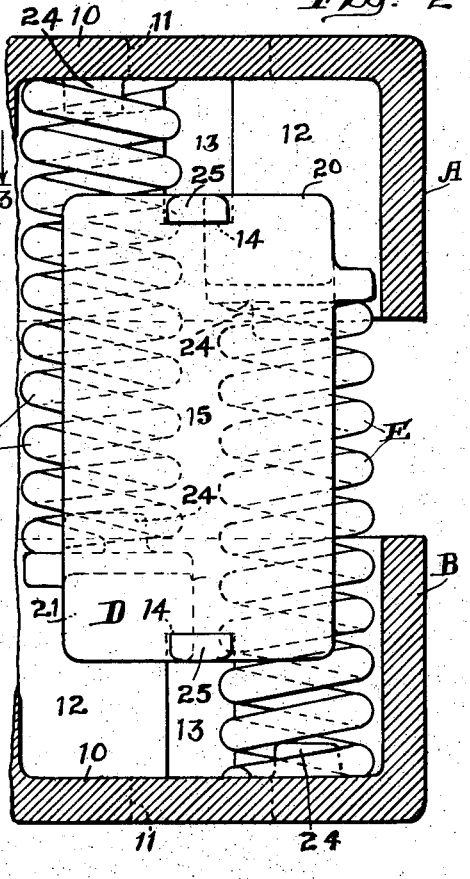
Figure 3:
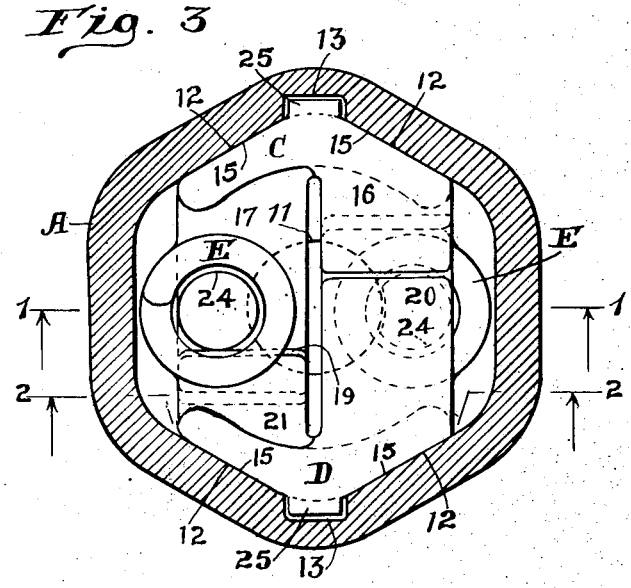
Figure 4:
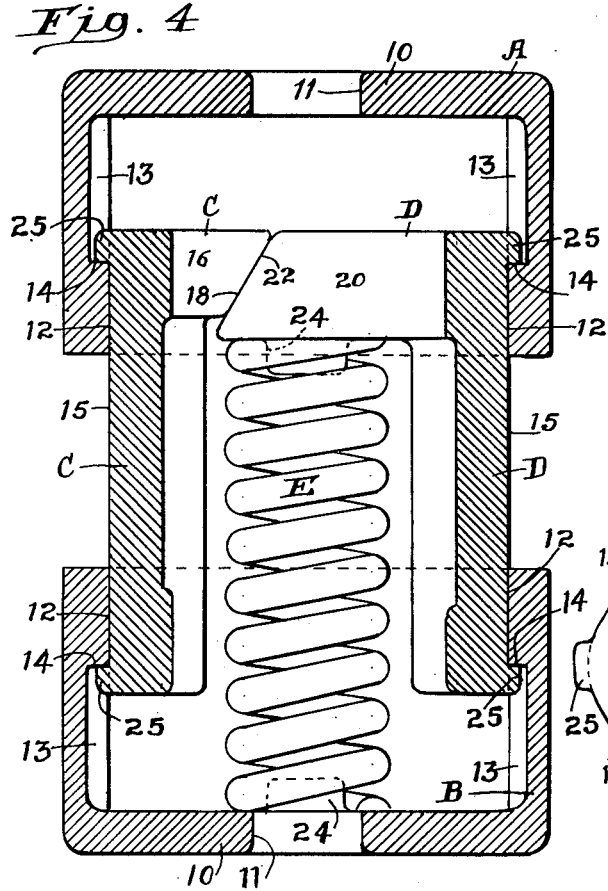
Figure 6:
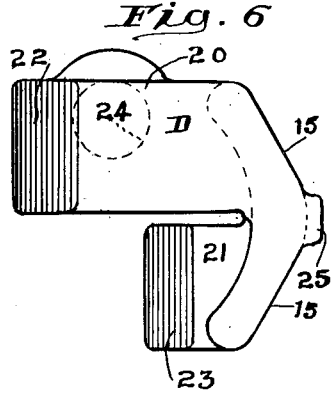
Figure 7:
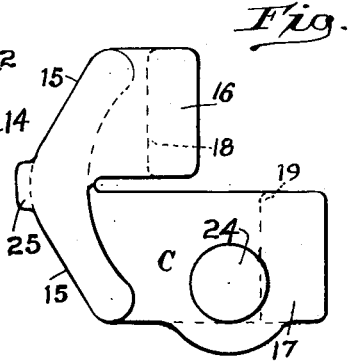
Figure 5:
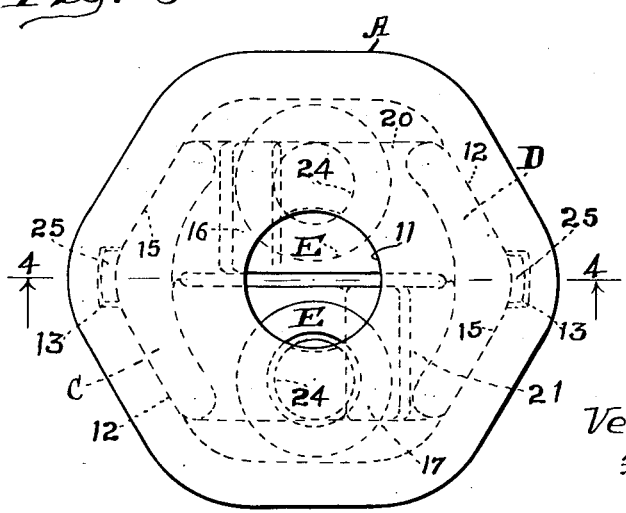

In the accompanying drawings forming a part of this specification, Figure 1 is a transverse, vertical sectional view of my improved snubber, corresponding substantially to the line 1—1 of Figure 3, with the right hand spring omitted. Figure 2 is a vertical sectional view, corresponding substantially to the line 2—2 of Figure 3. Figure 3 is a horizontal sectional view, corresponding substantially to the line 3—3 of Figure 1. Figure 4 is a transverse, vertical sectional view in a plane at right angles to the section shown in Figure 1, and corresponding substantially to the line 4—4 of Figure 5. Figure 5 is a top plan view of Figure 4. Figure 6 is a top plan view of the friction shoe at the right hand side of Figure 4. Figure 7 is a top plan view of the friction shoe at the left hand side of Figure 4.

My improved shock absorber, as illustrated in the drawings, comprises broadly top and bottom friction casings A and B, friction shoes C and D, and springs E—E.

The top and bottom friction casings A and B are of the same design, each being in the form of a tubular, cup-shaped member of hexagonal, transverse cross section, having a transverse outer end wall 10. The top casing A is open at the bottom and has the wall 10 at the top end thereof, and the bottom casing B is open at the top and has the transverse wall 10 at the bottom end of the same. The walls 10—10 of the casings A and B have central openings 11—11 extending therethrough, adapted to receive the usual spring centering projections of the top and bottom spring plates of a cluster of railway car truck springs. Each casing is provided with interior, opposed friction surfaces 12—12 of V-shaped, transverse cross section, extending parallel to the longitudinal central axis of the mechanism. At each of the corners of the casing, where the sections of each V-shaped friction surface meet, the interior wall of the casing is slotted lengthwise, as indicated at 13. The slots 13—13 of the two friction surfaces are disposed at diametrically opposite sides of the casing and each slot terminates inwardly of the open end of said casing. The wall defining the outer end of the slot forms a stop shoulder 14 for a purpose hereinafter pointed out. The two shoes C and D are arranged at opposite sides of the mechanism with their top and bottom ends projecting into and slidingly engaged within the top and bottom casings A and B, respectively. Each shoe C and D comprises a vertically extending, elongated, platelike section, having a lengthwise extending friction surface 15 of V-shaped, transverse section on its outer side engaged with the friction surfaces 12—12 at the corresponding sides of the top and bottom casings A and B. The shoe C has an inwardly projecting, horizontally extending, relatively short arm 16 at its upper end, and an inwardly projecting, relatively longer, horizontal arm 17 at its lower end. The arms 16 and 17 are laterally offset with respect to each other, being at opposite sides of a vertical plane extending centrally through the shoe C. The arm 16 has a downwardly facing, laterally outwardly inclined wedge face 18 at its outer end, and the arm 17 has a downwardly facing, laterally outwardly inclined wedge face 19 at its outer end. The shoe D has an inwardly extending, relatively long arm 20 at its upper end, and an inwardly projecting, relatively shorter, horizontal arm 21 at its lower end. The arms 20 and 21 are laterally offset with respect to each other in a manner similar to the arms 16 and 17, the arm 20 being opposed to and in alignment with the arm 16, and the arm 21 being opposed to and in alignment with the arm 17. The arm 20 extends toward the arm 16 and has an upwardly facing, laterally inwardly inclined wedge face 22 at its outer end, engaged with the wedge face 18 of the arm 16 of the shoe C, and the arm 21 extends toward the arm 17 and has an upwardly facing, laterally inwardly inclined wedge face 23 at its outer end engaged with the wedge face 19 of the shoe C. At their top and bottom ends, the shoes C and D have laterally projecting lugs 25 respectively extending into the slots 13—13 at the corresponding sides of the top and bottom casings A and B, and engageable with the shoulders 14—14 of said slots, to limit lengthwise outward movement of the casings A and B with respect to said shoes.

The springs E—E are arranged side by side between the shoes C and D, the spring on the left hand side of the mechanism, as seen in Figures 1 and 2, bearing at its top and bottom ends, respectively, on the end wall 10 of the casing A and the upper side of the arm 17 of the shoe C, and the spring at the right hand side, as seen in Figure 2, bearing at its top and bottom ends, respectively, on the underneath side of the arm 20 of the shoe D and the wall 10 of the casing B, the arm 17 of the shoe C and the wall 10 of the casing A, and the arm 20 of the shoe D and the wall 10 of the casing B being provided with centering lugs 24—24—24—24 engaged within the top and bottom ends of said springs for holding the same in position.

My improved shock absorber replaces one or more of the spring units of a truck spring cluster of a railway car, being interposed between the top and bottom spring plates of said cluster.

The operation of my improved shock absorber is as follows: Upon the spring cluster of the truck of a railway car being compressed between the spring follower plates of said cluster, the casing A is forced downwardly toward the casing B, thereby effecting relative sliding movement between the casing A and the shoes C and D, and between the latter and the casing B, the shoes being pressed into wedging engagement with each other by the springs E—E and forced laterally apart against the friction surfaces of the casing. During compression of the mechanism, the spring E, which bears on the arm 17 of the shoe C, is compressed between the top wall of the casing A and the arm 17 of said shoe, and the spring E, which bears on the arm 20 of the shoe D, is compressed between the arm 20 of the shoe D and the bottom wall of the casing B. Progressively increasing wedging pressure between the shoes is thus provided, with correspondingly progressively increasing frictional resistance, during the compression stroke of the mechanism to effectively snub the action of the truck springs of a railway car.

I claim:

1. In a friction shock absorber, the combination with a pair of friction casings movable endwise toward each other; of friction shoes between said casings in sliding frictional engagement with the interior walls of the latter; and springs yieldingly opposing relative movement of the shoes with respect to said casings, said springs being disposed at opposite sides of the shock absorber alongside each other one of said springs abutting one of said casings at one end and one of said shoes at the other end, and another of said springs abutting the other of said casings at one end and another of said shoes at the other end, said shoes having wedging engagement with each other.

2. In a friction shock absorber, the combination with top and bottom friction casings movable lengthwise toward each other; of a pair of lengthwise extending friction shoes between said casings, each shoe having its opposite ends slidingly engaged within said casings, respectively; top and bottom, interengaged, laterally extending wedge projections at the upper and lower ends of said shoes; a spring bearing at its upper end on the laterally extending, top wedge projection of one of said shoes and at its lower end on the bottom casing; and a second spring bearing at its lower end on the laterally extending bottom wedge projection of the other of said shoes, and at its upper end on the top casing.

3. In a friction shock absorber, the combination with a casing; of a second casing, said casings movable toward and away from each other, said casings having interior friction surfaces; a friction shoe having friction surfaces at opposite end portions thereof which are engaged within said casings, a second friction shoe having friction surfaces at opposite end portions thereof which are engaged within said casings, said first named shoe having a spring abutment at the end thereof which extends into said first named casing, said spring abutment having a wedge face in wedging engagement with the corresponding end of the second named shoe, said second named shoe having a spring abutment at the end thereof which extends into said second named casing, said last named spring abutment being in wedging engagement with the corresponding end of the said first named shoe; and a pair of springs, one of said springs bearing at one end on the spring abutment of said first named shoe, and at its other end on said second named casing and the other of said springs bearing at one end on the spring abutment of the second named shoe and at its other end on said first named casing.

4. In a friction shock absorber, the combination with a top friction casing; of a bottom friction casing, said casings being movable toward and away from each other; a spring bearing at its bottom end on the bottom casing; a friction shoe in sliding engagement with both casings; a lateral arm at the upper end of said shoe; a wedge face on said arm, said arm bearing on the upper end of said spring; a wedge face on the lower end of said shoe; a second shoe in sliding engagement with both casings; a lateral arm at the lower end of said second shoe; a wedge face on said arm engaged with the wedge face at the lower end of said first named shoe; a wedge face on the upper end of said second named shoe engaged with the wedge face of the arm of said first named shoe; and a second spring bearing at its lower end on the arm of said second named shoe and at its upper end on said top casing.

5. In a friction shock absorber, the combination with a pair of friction casings movable toward and away from each other lengthwise of the mechanism; of a pair of friction shoes, each shoe having its opposite ends slidingly telescoped within said casings, respectively; a spring abutment at each end of the mechanism, the abutment at one end of the mechanism being rigid with one of said shoes, and the abutment at the other end of the mechanism being rigid with said other shoe, the spring abutment of each shoe and the corresponding end of the other shoe having cooperating wedge faces thereon; spring abutment means on each casing at the outer end thereof; a spring interposed and reacting between the spring abutment at said one end of the mechanism and the spring abutment means of the casing at said other end of the mechanism; and a second spring interposed and reacting between the spring abutment at said other end of the mechanism and the spring abutment means of the casing at said one end of the mechanism.

6. In a friction shock absorber, the combination with a pair of lengthwise extending friction shoes having friction surfaces on the outer sides thereof; of friction casings telescoped over opposite ends of said shoes, said casings having interior friction surfaces in sliding engagement with the friction surfaces of said shoes; a spring abutment on each casing at the outer end thereof; a spring bearing at one end on the spring abutment of one of said casings; a spring abutment on one of said shoes bearing on the other end of said spring; a second spring bearing at one end on the spring abutment of the other casing; a spring abutment on the other of said shoes bearing on the other end of said last named spring said springs being disposed side by side with said other end of said first named spring extending beyond said other end of said second named spring; and cooperating wedge faces on each shoe and the spring abutment of the other shoe.

7. In a friction shock absorber, the combination with a lengthwise extending friction shoe; of a second lengthwise extending friction shoe, said shoes being arranged side by side and having friction surfaces on their outer sides; a friction casing at one end of the mechanism telescoped over the corresponding ends of said shoes, said casing having interior friction surfaces engaged with the friction surfaces of said shoes; a spring abutment at the outer end of said casing; a second friction casing at the other end of the mechanism telescoped over the corresponding ends of said shoes, said second casing having interior friction surfaces engaged with the friction surfaces of said shoes; a spring abutment at the outer end of said second named casing; a spring abutment on said first named shoe at the end thereof over which said second named friction casing is telescoped, said spring abutment and the corresponding end of the second named shoe having cooperating wedge faces; a spring abutment on said second named shoe at the end thereof over which said first named friction casing is telescoped, said spring abutment of said second named shoe and the corresponding end of the first named shoe having cooperating wedge faces; a spring bearing at opposite ends on said spring abutment of said first named shoe and said spring abutment of said first named casing; and a second spring bearing at opposite ends on said spring abutment of said second named shoe and said spring abutment of said second named casing.

VERNON S. DANIELSON.

REFERENCES CITED

The following references are of record in the file of this patent:

UNITED STATES PATENTS

| Number | Name | Date |
| --- | --- | --- |
| 1,378,868 | Johnson | May 24, 1921 |
| 1,608,951 | O'Connor | Nov. 30, 1926 |
| 1,883,049 | Sproul | Oct. 18, 1932 |
| 1,952,219 | Fuchs | Apr. 3, 1934 |
| 2,383,265 | Lehrman | Aug. 21, 1945 |